Feb. 14, 1961 D. B. SPALDING 2,971,343
PRESSURE EXCHANGER APPARATUS
Filed March 19, 1956 6 Sheets-Sheet 1

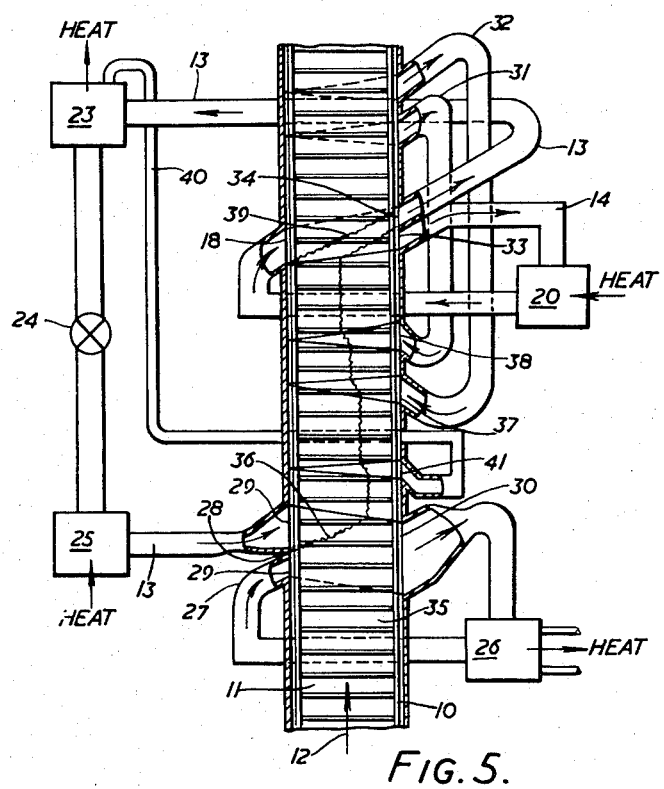
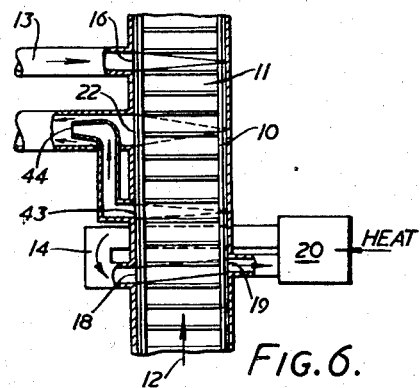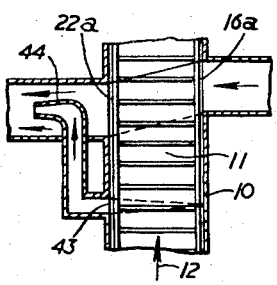
FIG. 5.
FIG. 6.   FIG. 7.

Feb. 14, 1961  D. B. SPALDING  2,971,343
PRESSURE EXCHANGER APPARATUS
Filed March 19, 1956  6 Sheets-Sheet 4
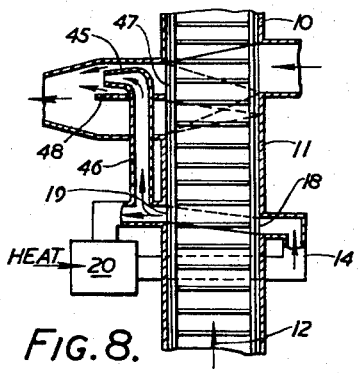
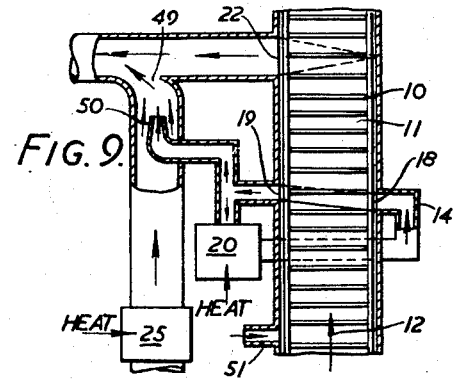
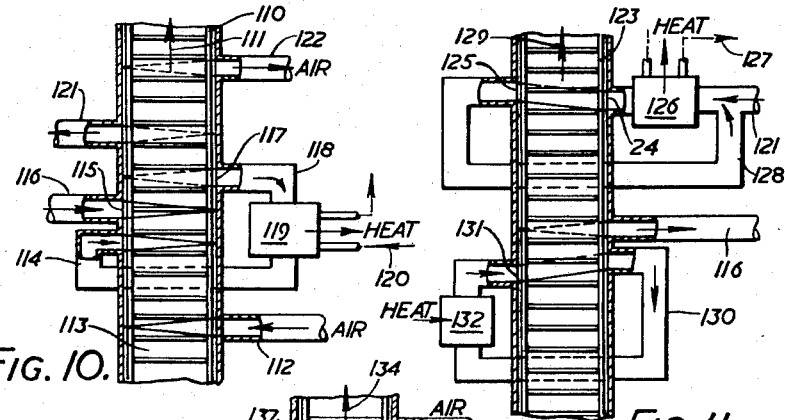
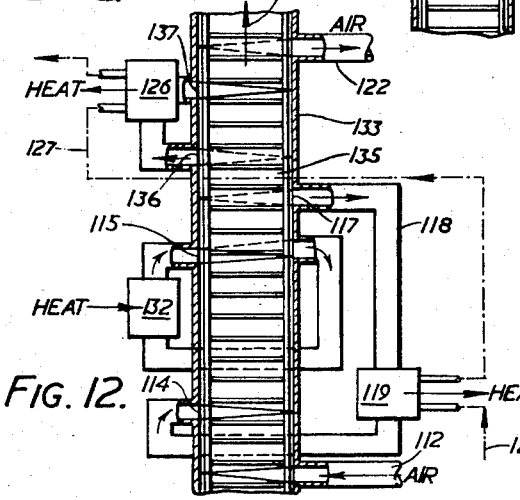

Feb. 14, 1961  D. B. SPALDING  2,971,343
PRESSURE EXCHANGER APPARATUS
Filed March 19, 1956  6 Sheets-Sheet 6

United States Patent Office 2,971,343
Patented Feb. 14, 1961

2,971,343

PRESSURE EXCHANGER APPARATUS

Dudley Brian Spalding, 2 Vineyard Hill Road,
Wimbledon, London SW. 19, England

Filed Mar. 19, 1956, Ser. No. 572,379

Claims priority, application Great Britain Mar. 24, 1955

12 Claims. (Cl. 62—6)

This invention relates to pressure exchanger apparatus. Apparatus for performance of a heat pump cycle and incorporating a pressure exchanger as a major component has been previously proposed and, moreover, commercially employed. The energy input for that apparatus was in the form of shaft power. It is, of course, known in conventional practice to have purely thermal heat pumps and a gas operated domestic refrigerator is an everyday example.

A pressure exchanger comprises cells in which one gas quantity expands so compressing another gas quantity with which it is in direct contact, ducting to lead gas steadily to and from the cells at different pressures, and means to effect relative motion between the cells and the ducting.

The present invention provides pressure exchanger apparatus arranged to perform a heat pump function with a refrigerant fluid and in which energy input necessary for the performance is arranged to be supplied in the form of heat.

The refrigerant fluid may repeatedly undergo a cyclic operation or alternatively there may be continual replacement of the fluid. The fluid may change phase or alternatively remain gaseous throughout.

The heat supply may well be delivered to a second fluid stream within the apparatus.

The refrigerant fluid may be compressed in the cells extracted therefrom and cooled. Thereafter it may be returned to the cells, either immediately or after passing through a throttle and means from which heat may be absorbed by the fluid. The fluid compression in the cells can, for example, result from fluid circulation in a circuit incorporating heating means or from a high pressure steam supply delivered to the cells. There may be another fluid circulating circuit connected to the cell ring with fluid cooling means inserted in it. The cooling means through which the extracted and compressed refrigerant fluid is passed may comprise a still or a drying chamber.

An ejector system can conveniently be incorporated to assist the flow of fluid in the apparatus.

Embodiments of the invention are shown in the accompanying drawings. They are by way of example only.

Figure 3:
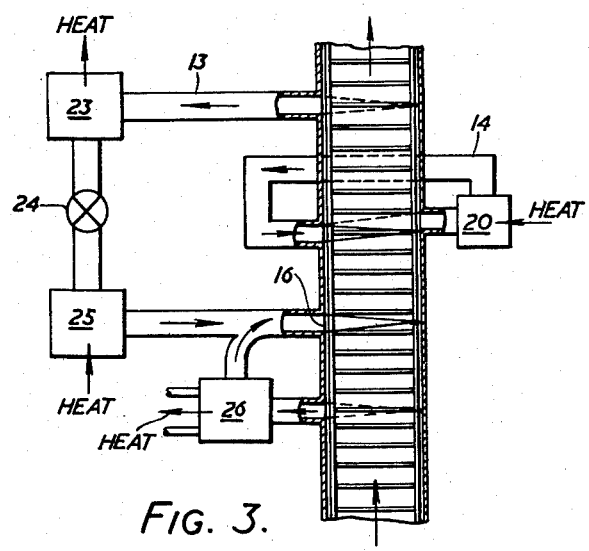

In Figure 3 the additional cooling circuit has been re-positioned.

In Figure 4 the apparatus has again been modified, this time in the arrangement of the heating circuit and transfer passages.

Figure 4:
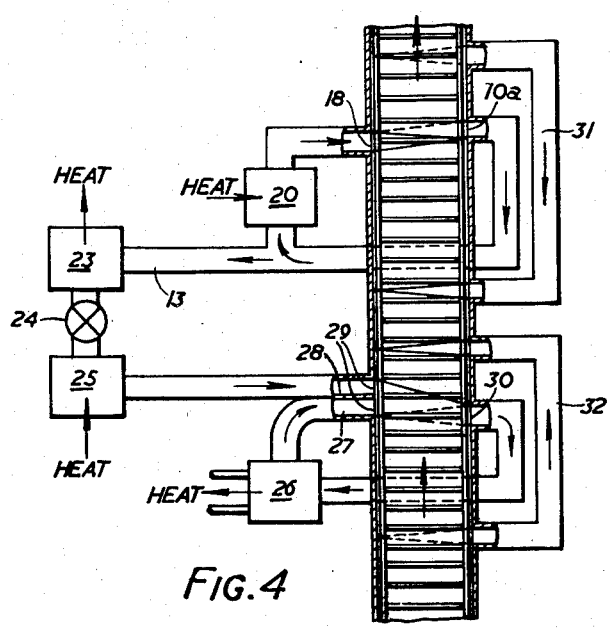

Figure 5 is a more detailed view of apparatus generally similar to that of Figure 4 but with heat input delivered to a second fluid stream within the apparatus.

Figures 6 to 9 show how an ejector system may be incorporated in the system to help in the extraction of low pressure vapour from the evaporator of the apparatus of Figures 1 to 5.

Figure 10 shows a pressure exchanger heat pump in which atmospheric air enters the cells of a pressure exchanger and compression is effected by means of working fluid from an outside source.

Figure 11 shows how another pressure exchanger may be arranged as the outside source of working fluid for the heat pump of Figure 10.

In Figure 12 the two pressure exchangers necessary in Figures 10 and 11 have been combined to provide a compact single rotor arrangement.

Figure 13:
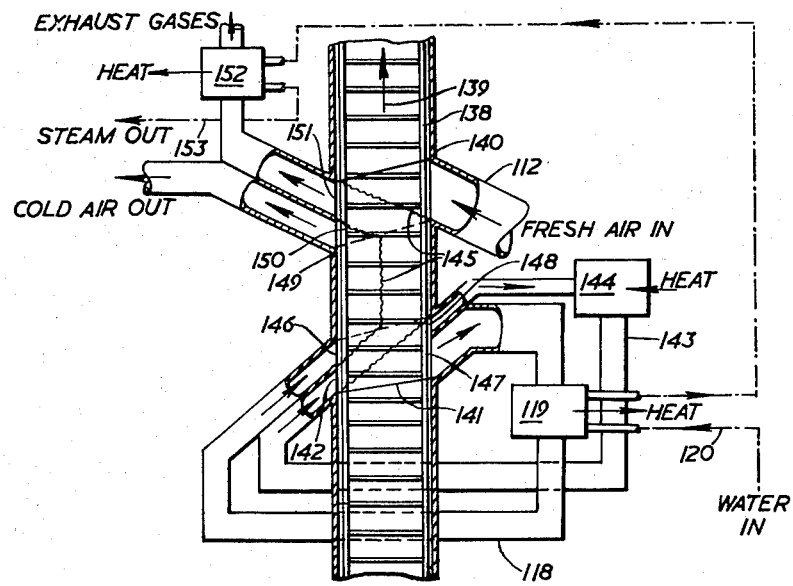

In Figure 13, which shows another embodiment with air as the refrigerant fluid, the opportunity has been taken to illustrate the division between different fluid streams within the pressure exchanger cells.

Figure 14:
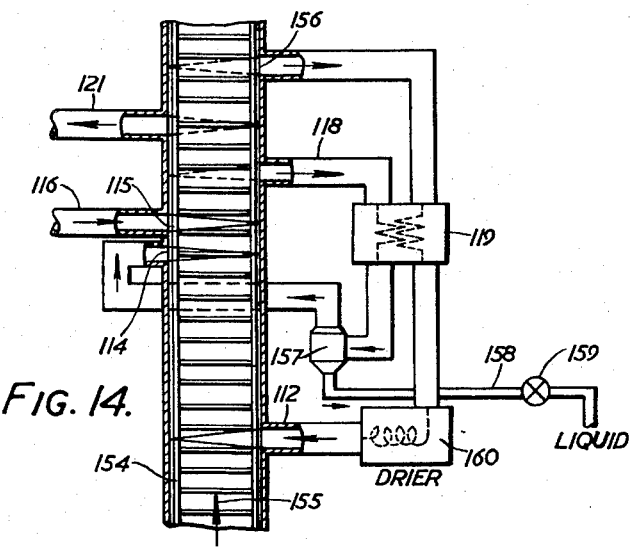

In Figure 14, there is shown the application of this invention to a drying plant, the air circulating in the heat pump cycle passing through a drying chamber wherein it takes up moisture and falls in temperature.

Figure 15:
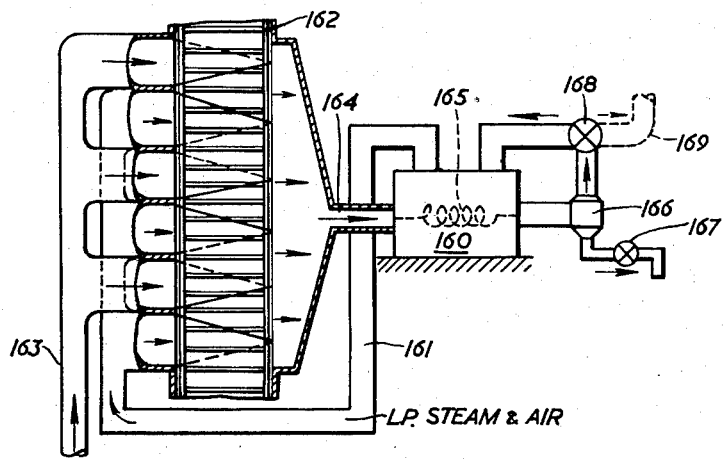

Figure 15 shows a simplified drying apparatus in which steam is supplied to the pressure exchanger rotor for compression of the wet air received from the drying chamber.

Figure 16:
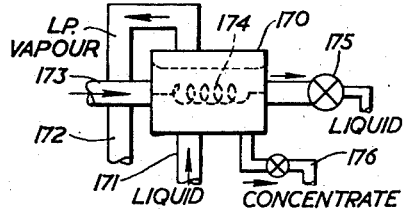

Figure 16 illustrates how the invention may be applied to a distillation process, namely the separation of water from brine by a steam supply fed to a pressure exchanger to which the still is also connected.

Figure 17:
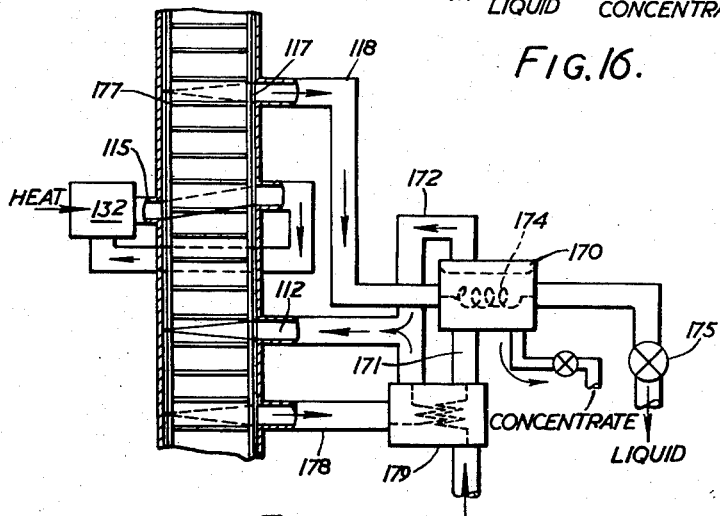

Figure 17 provides a diagrammatic representation of another distillation arrangement with an indirect heating arrangement replacing the steam supply.

Figure 1:
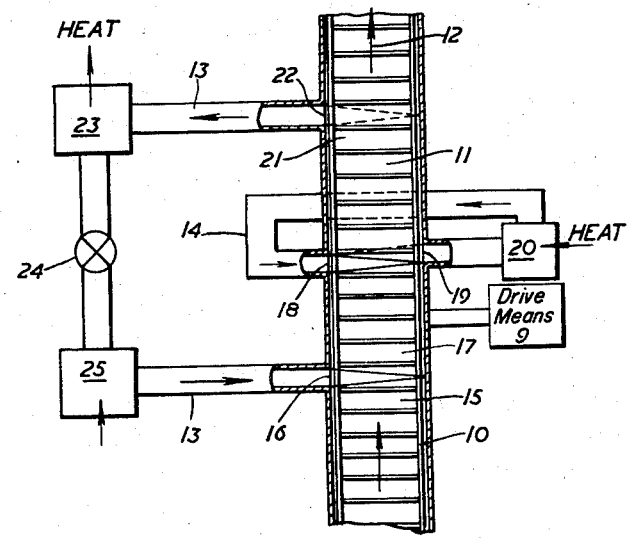
Figure 1 shows diagrammatically a developed view of closed cycle apparatus incorporating a pressure exchanger and operable as a thermal heat pump.

In Figure 1 a developed pressure exchanger cell rotor 10 has cells 11 and rotates under the power of the drive means 9 in the direction of the arrow 12 relative to stationary ducting. The ducting consists of two circuits 13 and 14 into each of which a refrigerant fluid flows from the cells and each of which returns to those cells substantially the same fluid mass flow as it receives. It will be seen that the apparatus is arranged for the refrigerant fluid to follow a closed cycle; it is a vapour compression process with dichlorodifluoromethane as the preferred fluid.

Consider a cell at position 15 approaching the entry port 16 from the duct circuit 13. The vapour in the cell is at a lower pressure than that entering through the port 16 so that a compression wave passes through the cell and is reflected back from opposite end. The rotational speed is arranged in conjunction with the port width for the wave to travel through the cell and back during the time a cell is passing the port.

The cell passing to position 17 is at a higher vapour pressure than before it reached the port 16 and also at a higher pressure than that obtaining in the duct 13 immediately upstream of the port 16.

The ports 18 and 19 are met in succession as the cell progresses. From the first, heated vapour at a yet higher pressure is received and through the port 19 some at least of the vapour content of the cell passes into the closed duct circuit 14. In this circuit there is incorporated an indirect heat input device 20. As the circuit is closed a constant volume heating effect is obtained so far as the contents of any cell are concerned and a pressure ratio substantially proportional to the absolute temperature ratio is attained.

Further progress of the cell beyond position 21 brings it into communication with the port 22 leading to the duct circuit 13. Further expansion takes place through this port and the cell content returns to the condition in which it was initially considered upstream of the port 16.

Vapour passes into the duct circuit 13 and encounters a heat sink 23 in which condensation takes place. Further cooling follows after passage through the throttle 24 as vapour is evolved and then heat is again taken up from the low temperature heat source 25. From thence, the vapour passes towards the port 16 leading to the cell rotor and the cycle recommences.

It will be observed that the cycle of operation is conventional but the ability of a pressure exchanger to effect compression has been utilised in an advantageous manner. The main heat input source 20 introduces the necessary energy into the cycle. The rotating cell wheel is of simple construction and can be arranged to be self-driving in normal operation by appropriate duct and cell design. It is preferably enclosed in a sealed compartment so that any leakage between stationary and rotating parts is rendered harmless and can be returned to the cycle.

The apparatus described above might require a circulating pump in order to effect initial operation. Once the cell rotor 10 is rotating at its design speed and fluid circulation is proceeding, operation should continue satisfactorily with shock and expansion waves at the ports 16 and 22 in particular contributing their full share to the cycle. Even so it may prove difficult with this simple apparatus to achieve a large temperature range, because the cell pressure after exhaust to the condenser 23 cannot easily be made lower than about half of that prevailing in the condenser.

Figure 2:
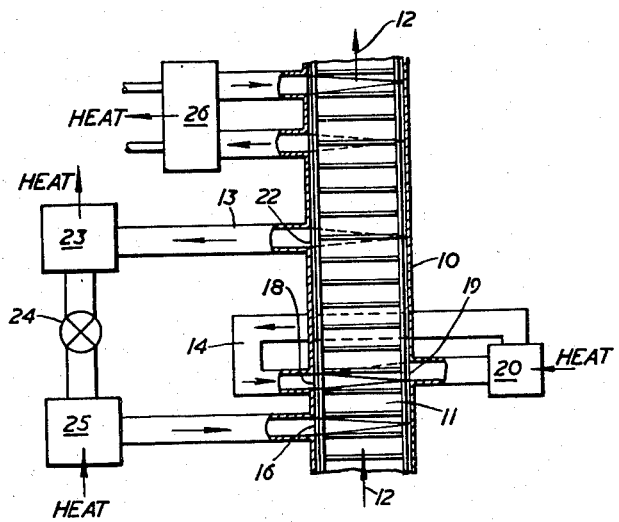
Figure 2 shows a modified form of the Figure 1 arrangement in which an additional cooling circuit is incorporated.

An improvement can be effected by the addition of a cooling stage after fluid has left a cell to pass towards the condenser 23. The modified arrangement is shown in Figure 2, the drive means having been omitted in this and the other figures hereafter. The temperature of the vapour left in a cell leaving the port 22 and moving onwards has to be above the condenser temperature, so that the pressure can be lowered below the condenser pressure. That is the residual vapour is superheated. The cooling stage of Figure 2 consists of a closed circuit by means of which fluid is taken from the cell rotor, passed through a cooler 26 and re-introduced into the cell rotor. A cell then approaching the port 16 is at a lower pressure than the stagnation pressure in the duct leading from the low temperature heat source or evaporator 25 to the port 16. Hence fluid flow occurs in the right direction, establishing the operating cycle even when the rotor speed is such that wave reflections do not correlate with port widths as they do at the design speed.

The heat pump arrangement of Figure 3 has a closed circuit heating and an open circuit cooling combination. The cooling circuit incorporating the cooler 26 is still in the same cycle position but fluid passing therethrough re-enters the cell rotor through the same port 16 as that which has undergone the condensing expansion and evaporating stages. Comparing Figures 2 and 3 in relation to their cooling stages it will be appreciated that in Figure 2 there is cooling effectively at constant volume and in Figure 3 cooling is more nearly at constant pressure. In other respects the cycle is unaltered. An improved thermal efficiency can be expected as temperature-entropy cycle diagrams readily show. One disadvantage is introduced by this arrangement, however, the vapours leaving the evaporator 25 and the cooler 26 mix. This can be avoided by subdividing the entry port 16 in the manner shown in Figure 4.

In Figure 4 the duct 27 taking cooled fluid from the cooler 26 to the cell rotor is separated by a partition 28 from that leading fluid from the evaporator 25 to the cells. Both fluid streams enter the cell rotor at the same stage via a divided port 29. The width of this port is such that, at the design conditions of operation, the required wave effect and particle travel can occur in the cell whilst a cell wall traverses the port. The outlet port 30 through which fluid passes into the cooling circuit is here situated so that its reflected expansion wave cancels out the initial shock wave from the upstream edge of the port 29. Fluid in a cell as it approaches the cooling stage is therefore almost entirely exhausted through the port 30. Fluid entering from the cooler 26 is carried to the other end of the cell from the port 29 and that from the evaporator 25 fills the remaining left hand end of the cell.

The subdivided port 29 could be incorporated by itself into the Figure 3 arrangement; in Figure 4 it has been embodied into apparatus which also has an open circuit heating system and transfer channels. Considering the main heat input circuit, it will be noticed that the port 10a allows fluid to pass to the heater 20 and thence back via the port 18 to the cell rotor. The same port 19a however now gives access also to the condenser 23. Hence heat input is effectively at constant pressure. Two transfer channels 31 and 32 have been introduced. These, in known manner, enable some of the pressure rise introduced into the cell contents by the shock waves at the port 18 to be transferred to other cells passing between the cooling and heating stages.

By a slight re-arrangement of the ports and by paying particular attention to the avoidance of mixing of streams within a cell, it is possible to employ different fluids for the circuit through the cooler 26 and the circuit through the heater 20 on the one hand, and for the operating cycle incorporating condenser 23 and evaporator 25 on the other hand. By such means different fluids with appropriate heat transfer rates for the duties they have to perform may be used. Thus hydrogen might be used as a second or working fluid in place of the condensible fluid which above has been supposed to pass through the heating and cooling circuits. This gas has the advantages of (a) not condensing at temperatures likely to prevail in such equipment and (b) having a high thermal conductivity and diffusion coefficient. If this refinement is adopted it is necessary to incorporate means for separating out any fluid which inadvertently enters the wrong circuit, for example by a bleed from the end of the condenser, remote from the vapour entry, leading to the evaporator.

In Figure 5, the refrigerant fluid passes through the condensation, expansion and vaporisation circuit 13 whilst a second or working stream undergoes separate heating and cooling. The opportunity has been taken in this illustration to give more detail of the construction of the pressure exchanger component of the apparatus. The cooling circuit and transfer channels are arranged as in Figure 4 but the heating circuit 14 is not quite the same in that the port 33 leading to it is immediately alongside a port 34 through which the refrigerant fluid enters the circuit 13.

Consider the cell at position 35 approaching the port 30. The cell contents are working fluid at a low pressure. The expansion wave at the leading edge of the port 30 causes the working fluid to pass to the cooler 26 and back via the pipe 27 and the leading part of the divided port 29 to the other end of the cell. The fluid movement in the cell continues as the refrigerant fluid enters from the circuit 13 through the trailing part of the port 29, the working fluid moving towards the opposite end, the right hand end as shown, of the cell. The wavy line 36 indicates the line of demarcation between the refrigerant and working fluids. The cell contents are brought to rest by the compression wave initiated by the trailing edge of the port 30. Some further compression of the cell contents is accomplished as the cell passes the ports 37 and 38. The function of the port 41 will be described below. Through the ports 37 and 38 some working fluid enters from the transfer channels 32 and 31 respectively. The cell contents, refrigerant fluid at the left hand end as shown and working fluid at the right hand end, are next set in motion by the compression wave emanating from the leading edge of the port 18. Through this port, more working fluid enters the cell from the heating circuit 14. Into that circuit through the port 33 flows the compressed working fluid initially in the cell. The refrigerant fluid in the cell travels down the length of the cell and out via the port 34. Hot compressed working fluid fills the cell and is brought to rest by the expansion wave initiated as the cell passes the trailing edge of the port 18. A second line of demarcation between the two fluids is shown at 39. The pressure of the working fluid remaining in the cell is reduced as it passes the ends of the transfer channels 31 and 32. Thereafter the cell returns to the position 35 initially considered.

Should working fluid inadvertently become mixed with the refrigerant fluid it can be separated out from the condenser 23. For example, it has been suggested above that hydrogen could be used as the working fluid; this can be removed from the condenser by the tapping pipe 40. This pipe is taken to a port 41 situated so that the recovered working fluid is introduced to the cells at their ends which already contain the same fluid.

In the pressure exchanger apparatus described above, the vapour drawn in to the pressure exchanger cell rotor from the evaporator 25 is at a lower pressure than that exhausted to the condenser 23. An ejector system may be incorporated to supplement the compression and expansion wave effects in the cells and to render unnecessary the cooling circuit first introduced above in Figure 2. Four possible ways of arranging an ejector system in the apparatus of Figure 1 are shown in Figures 6 to 9. Inspection will reveal that the ports 16, 18, 19 and 22 are incorporated in the same order in Figures 6 and 2, but an additional port 43 has been provided between the heating circuit 14 and the exhausting port 22. From the additional port some fluid is taken to provide extra driving effect through the ejector 44 on the refrigerant fluid passing downstream of the port 22 towards the condenser 23.

Figure 7 indicates a minor modification of the Figure 6 arrangement. The heating circuit 14 has not been shown. The inlet port 16a from the evaporator and the outlet port 22a to the condenser are arranged as a low pressure scavenging stage with an ejector 44 in the downstream branch.

In Figure 8 the ejector 45 is fed from a bleed pipe 46 taken from the heating circuit 14. The port 47 leading to the condenser is divided and the initial part of the duct circuit 13 is bifurcated by a partition 48. The ejector acts in one part only of the bifurcated duct which unites further downstream.

In Figure 9 there is again an ejector fed by a bleed pipe 46 from the heating circuit 14 but, in this embodiment, the vapour from the evaporator 25 is not returned to the cells. Instead, it rejoins at 49 the fluid passing towards the condenser 23 and circulation is encouraged by the ejector 50. Liquid collected from the condenser 23 is fed to the cells via an auxiliary inlet 51 and evaporated when the heating circuit 14 is reached.

In a domestic application of the apparatus described above the duct circuit 13 could incorporate parts including the heat sink 23 which are buried outdoors. The low temperature heat source 25 could appropriately be a food storing refrigerator cabinet. The heat input device at 20 could, for instance, be either gas or electrically operated and the heat input quantity could be thermostatically controlled from the food store or low temperature heat source 25.

In all of the embodiments so far described the refrigerant fluid has followed a closed vapour compression cycle and, except in the instance of the Figure 5 apparatus, there has been one fluid only in the apparatus. The following description will show the wide scope of the invention for various representative embodiments will demonstrate how it may be applied to air heat pumps, drying processes and distillation equipment.

In Figure 10 there is shown a developed view of a pressure exchanger cell wheel 110 which rotates in the direction of the arrow 111 relative to stationary ducting. Air, the refrigerant fluid in this case, enters the cells of the pressure exchanger through the duct 112, the port width being such that, in the design conditions of operation, a shock wave leaving the upstream edge of the port has time to reach the other end of the cell and be reflected back to the downstream edge of the port whilst a cell passes that port. The shock wave is caused because the stagnation pressure of the air in the duct 112 is higher than that in a cell 113 approaching that duct. As each cell passes on its way it encounters in turn ports 114 and 115, at each of which shock wave action similar to that described above takes place so that a cell immediately after it has left port 115 contains air at a pressure substantially above that at which it enters through the duct 112. In so far as the shock wave action at the port 115 is concerned, this is due to the intake of a second fluid, namely a compressed working fluid, through the duct 116. The latter fluid comes from a source outside this pressure exchanger which has not been shown in the figure but which will be discussed later. As the cell continues on its way it next encounters a port 117, through which port the air part of the cell contents or most of it expands into the duct circuit 118. That duct circuit incorporates a heat exchanger 119 through which heat is given up to third fluid flowing in pipe system 120. This fluid may, for instance, be water, cold water passing into the heat exchanger 119 and warm water being received therefrom. The colder air which has passed through the heat exchanger 119 re-enters the pressure exchanger cell wheel through the port 114. The working fluid supplied through the duct 116 leaves the cells through the duct 121 and finally some cold air remaining in the cells is allowed to exhaust through the duct 122. This leaves air in the cells of the pressure exchanger at a pressure level below that obtaining in the duct 112 and the cycle of operation recommences with the cell in the position 113. It will be seen that air has entered the pressure exchanger, been compressed therein particularly by the working fluid entering through the duct 116, it has been taken from the pressure exchanger and cooled in the heat exchanger 119, it has re-entered the pressure exchanger and finally exhausted as cold air through the exhaust duct 122. The energy input for the system has been delivered via the working fluid stream which has been supplied through the duct 116.

In Figure 11 there is shown another pressure exchanger which supplies, through the input of heat energy, the working fluid stream for the heat pump pressure exchanger of Figure 10. The two are then combined together to complete the whole thermal heat pump action. Working fluid is returned to this second pressure exchanger cell wheel 123 through the duct 121 and a low pressure scavenging action takes place through the ports 124 and 125. Heat is extracted from the working fluid through the heat exchanger 126, the heat rejected being given up to a fluid in the pipe 127, which may be a continuation of the pipe 120 previously referred to with reference to Figure 10. The cold working fluid is returned to the scavenging circuit via the duct 128 which connects with the duct 121. The cell wheel rotates in the direction of arrow 129 so that the cell full of cool low pressure working fluid passes on its way until it meets the closed duct circuit 130 with its indirect heat input. Through the port 131 high pressure hot working fluid is supplied to the cell wheel and the shock wave action which occurs at the port compresses fluid within the cell. Fluid required for the heat pump pressure exchanger of Figure 10 is extracted through the duct 116 with which each cell communicates after it has left the heat input duct 130. It will be seen that this pressure exchanger enables a continuous supply of working fluid at high pressure to be supplied via the duct 116 and returned via the duct 121, the energy input being in the form of heat introduced at 132 into the closed duct system 130.

In Figure 12 there is one pressure exchanger cell ring 133 which rotates in the direction of 134 relative to various stationary ducts. This single pressure exchanger combines the functions of the apparatuses of both Figures 10 and 11; the heat input and the heat pump circuits both communicate with the same cell rotor. Air, again the refrigerant fluid, enters through the duct 112 and is compressed in the cells of the rotor 133 as it passes the ports 114 and 115. Through the latter port working fluid enters having been heated in the indirect heat input device 132. This is arranged in a closed circuit providing heat input effectively at constant volume and thereby a pressure rise for the pressure exchanger cell contents in known manner. Air passes out through the port 117 into the duct 118 to be cooled in the cooler 119 and it re-enters the cell ring at port 114. The heat exchanger 119 warms the fluid in the pipe 120 as before. When the cell reaches the position 135 it contains both working fluid and cold air and the working fluid part is extracted through the port 136 and passes to the cooler 126. The fluid in the pipe 127 is warmed by heat exchange in the heat exchanger 126 and the pipe 127 can be conveniently connected as shown in the same circuit as the pipe 120. This pipe may carry water which is heated by heat exchange at 19 and 26. Cold working fluid re-enters the cell ring at the port 137 and cold air leaves via the duct 122. The cycle of operation is then repeated. Unless the working fluid is the same as that which is acted upon, in this case air, a separate make-up supply of working fluid has to be provided to allow for leakage and other escape from the closed working fluid cycle.

No attempt has been made above to show how the two fluids, refrigerant and working are kept in separate streams in the Figure 12 arrangement, but the opportunity has been taken in describing the embodiment of Figure 13 to indicate the division between the streams within the cells as well as in the ducts outside. This is particularly important if direct heating is employed, in place of indirect heating, with combustion gases entering the cells. In Figure 13, refrigerant air enters through the duct 112 into the pressure exchanger cell rotor 138 which is moving in the direction of the arrow 139. The diagonal line terminating at the trailing edge 140 of the port through which the air enters represents a shock wave so that the air in the cell passing on in the direction of rotation is somewhat compressed. It is further compressed by passing through the shock wave 141 which is generated when a cell passes the port 142, through which hot high pressure working fluid enters the cells. This fluid is obtained from the closed circuit ducting 143 which incorporates a heat input in the form of combustion of fuel in the air stream at 144. The fluid entering the cell at 142 is therefore combustion gas and division between this gas and air in the cells is indicated by the wavy lines 145. Immediately after encountering the port 142 at one end, a cell encounters the ports 146 at the same end and 147 and 148 at the other end. Through the port 147 air leaves the cell rotor, having been compressed, and enters into the cooling duct circuit 118 which incorporates the cooler 119, wherein heat is given up to the water in the pipe 120. Cooled air re-enters the cell rotor through the port 146 at one end of the cell and compressed air for the heat input duct circuit 143 passes out through the port 148 at the other end. When a cell progresses it next encounters the duct edge 149 from which an expansion wave is generated across the length of the cell. The cell contents are set in motion and cold air passes out through the duct 150 and combustion gases which were contained in the cells pass out through the port 151. Before the exhaust gases pass to the stack they are taken through a heat exchanger 152, to the other side of which warm water is fed from the cooler 119 and from which steam is obtained, the latter passing out through the pipe 153. The cycle of operation then recommences with air entering through the duct 112. The port and scavenge arrangements of Figure 13 are preferred. Separated entries and exits are shown elsewhere purely for simplicity.

In the Figure 14 arrangement a cell rotor 154 rotates in the direction 155 relative to various ducts through one of which, 112, wet air, the refrigerant fluid in this case, is introduced into the pressure exchanger. It is compressed as before on its entry into the cell rotor and as it passes the port 114. It is further compressed as working fluid enters through the port 115 from the duct 116 from an outside source, such as a pressure exchanger arranged like Figure 11, and it is then passed through the cooling circuit 118. Working fluid is extracted through the duct 121 as in the Figure 10 arrangement and the heat pump refrigerant fluid is finally taken from the pressure exchanger through the port 156. It is then arranged to take up heat from the cooler 119. In the cooling circuit 118, condensation occurs, hence a separator 157 is incorporated. Liquid is drained off through the pipe 158 and reducing valve 159. In this arrangement there is a closed cycle of operation, the warmed air from the cooler 119 being passed through a drying chamber 160 from which moisture is taken up. The wet air then passes into the pressure exchanger and the cycle recommences.

In the Figure 14 embodiment care has to be taken to avoid mixing of the different fluids in the pressure exchanger cells, for where recirculation of air is effected, it is particularly important that that air should not mix with the working fluid. If it does then the air leaving through the port 156 will not be at a sufficiently low temperature for effective heat exchange to take place in the heat exchanger 119. It will be realised that it is alternatively possible finally to exhaust to atmosphere the air leaving through the duct 156, using the heat available in the cooler 119 directly in the drier 160, fresh air being drawn in through that drier. The effect of such an arrangement is to combine a drying apparatus with a refrigerating process.

A simpler drying chamber embodiment of the invention is given in Figure 15. The drying chamber 160 has low pressure steam and air extracted from it through the duct 161. This mixed fluid is fed to one end of the pressure exchanger rotor 162 alternately with a supply of high pressure steam obtained through the duct 163. The high pressure steam, from a boiler not shown, constitutes the working fluid stream. The effect of supplying low and high pressure fluids alternately in this manner is to provide from the other end of the cell rotor a fluid, in this case steam and air, at a fairly constant intermediate pressure. This fluid stream is collected and passed via a duct 164 to the heating coil 165 in the drying chamber 160. At the far end of the coil 165, there is a separator 166, condensate being drained off through the valve 167 and returned as feed water to the boiler. The air from the separator 166 is throttled at 168 and returned to the drying chamber. Alternatively it may be exhausted as shown dotted at 169 or even returned to the rotor 162. In either of these cases there must of course be a continuous supply of fresh air for the drying chamber 160.

The same general arrangement of a high pressure steam-operated pressure exchanger may be applied to a distillation process, e.g. the separation of pure water from brine. The pressure exchanger part of the distillation apparatus has been omitted from Figure 16 but it is similar to that of Figure 15. In Figure 16 there is a still 170 to which the supply liquid having two constituents with different boiling points is fed through the pipe 171. The heating in the still drives off low pressure vapour which is taken via the duct 172 to be supplied to the pressure exchanger rotor alternately with high pressure steam.

The medium pressure steam and vapour received at 173 from the pressure exchanger rotor is taken through the heating coil 174 in the still, giving up heat therein. Condensed liquid is taken from the reducing valve 175 and the concentrate is available from the pipe 176.

In the distillation apparatus of Figure 17, the still itself is as in Figure 16 but there is an indirect heater 132 in a closed heating circuit communicating with the pressure exchanger rotor 177, instead of a supply of steam as working fluid. The heating circuit, the refrigerant fluid entry duct 112 and the compressed fluid extraction duct 118 are as in Figure 12. In addition a cooling circuit has been added by means of which residual vapour in the cells is extracted through the duct 178 and cooled by heat exchange at 179 with liquid being fed to the still through the duct 171.

It is envisaged that there may be cases, when both working and refrigerant fluids are employed, for it to be advantageous to have the working fluid pressure ratio of pressure exchanger heat pump apparatus greater than the pressure ratio of the refrigerant fluid, that is the fluid which undergoes the compression and cooling stages.

What I claim is:

1. The combination of pressure exchanger and heat pump apparatus, comprising a series of cells for the compression and expansion of a fluid, the cells being arranged in a ring and having open ends, means defining common end walls for the cells and a series of ducts communicating with the cells at circumferentially spaced ports in the end walls, means for causing relative rotation between the ring of cells and the end walls, said series of ducts including in respective succession in one direction of rotation, a duct for admitting low temperature fluid to the cells, a duct for admitting hot compresesd fluid to the cells, a duct for removing high pressure fluid from the cells, and a duct for removing low pressure fluid from the cells, duct means forming a closed circuit between said third-named duct and said second-named duct and forming a closed circuit between said fourth-named duct and said first-named duct, means for heating the fluid in said first-named closed circuit, and means for cooling the fluid in said second-named closed circuit whereby it can serve as a refrigerant.

2. The combination according to claim 1 further comprising a low temperature heat source disposed to heat fluid in the second-named closed circuit and valve means disposed in the second-named closed circuit intermediate the points at which the fluid therein is cooled and heated.

3. The combination according to claim 1 further comprising extraction duct means for withdrawing super heated fluid from the cells at a port circumferentially spaced in one of the end walls intermediate respectively in said one direction of rotation the ports at which said fourth-named and said first-named ducts communicate with the cells, and means for cooling the super heated fluid and returning it to the cells.

4. The combination according to claim 3 wherein said last-named means comprises return duct means forming a closed circuit with the extraction duct means and communicating with the cells at a common port with the first-named duct, and means for cooling the fluid in the last-named closed circuit.

5. The combination according to claim 4 wherein the common port is bifurcated by a partition disposed to separate flow from the return duct means and from the first-named duct.

6. The combination according to claim 5 further comprising duct means for withdrawing low pressure fluid from the cells at a port circumferentially spaced in one of the end walls intermediate respectively in said one direction of rotation the ports at which said fourth-named and said first-named ducts communicate with the cells, and returning the low pressure fluid to the cells at a port circumferentially spaced in one of the end walls intermediate respectively in said one direction of rotation the ports at which said first-named and said second-named ducts communicate with the cells.

7. The combination according to claim 6 wherein the third-named duct and the fourth-named duct communicate with the cells at a common port in one of the end walls.

8. The combination according to claim 7 wherein the last-named common port is bifurcated by a partition disposed to separate flow into the third-named duct and into the fourth-named duct.

9. The combination according to claim 7 wherein the first-named closed circuit employs a working fluid different from the refrigerant fluid employed in the second-named closed circuit, and further comprising duct means for returning working fluid separated from refrigerant fluid in the first-mentioned cooling means to the cells at a port circumferentially spaced in one of the end walls intermediate respectively in said one direction of rotation the ports at which said first-named and said second-named ducts communicate with the cells.

10. The combination according to claim 1 further comprising ejector means in the second-named closed circuit and duct means for conveying high pressure fluid from the cells to the ejector means.

11. The combination according to claim 10 wherein the last-named duct means communicates with the third-named duct to convey high pressure fluid from the cells to the ejector means.

12. The combination according to claim 11 wherein the port at which the fourth-named duct communicates with the cells is bifurcated into portions by a partition and the ejector means is disposed in one of the portions.

References Cited in the file of this patent

UNITED STATES PATENTS

| | | |
|---|---|---|
| 2,045,152 | Lebre | June 23, 1936 |
| 2,084,691 | Lebre | June 22, 1937 |
| 2,127,286 | Bush | Aug. 16, 1938 |
| 2,157,229 | Bush | May 9, 1939 |
| 2,175,376 | Bush et al. | Oct. 10, 1939 |
| 2,399,394 | Seippel | Apr. 30, 1946 |
| 2,567,454 | Taconis | Sept. 11, 1951 |
| 2,697,593 | Rydberg | Dec. 21, 1954 |
| 2,738,123 | Hussman | Mar. 13, 1956 |
| 2,800,120 | Jendrassik | July 23, 1957 |
| 2,852,915 | Jendrassik | Sept. 23, 1958 |

FOREIGN PATENTS

| | | |
|---|---|---|
| 512,204 | Belgium | July 15, 1952 |
| 908,778 | Germany | Apr. 8, 1954 |